United States Patent
Hieber et al.

(10) Patent No.: US 6,422,588 B2
(45) Date of Patent: Jul. 23, 2002

(54) METHOD FOR THE TRANSFER OF A GAS BAG FOR A VEHICLE OCCUPANT RESTRAINT SYSTEM INTO A MOUNTING PROVIDED FOR THE GAS BAG

(75) Inventors: Wolfgang Hieber, Heubach-Buch; Wilfried Strnad; Jürgen Berger, both of Mutlangen, all of (DE)

(73) Assignee: TRW Occupant Restraint Systems GmbH & Co. KG, Aldorf (DE)

( * ) Notice: Subject to any disclaimer, the term of this patent is extended or adjusted under 35 U.S.C. 154(b) by 0 days.

(21) Appl. No.: 09/781,940

(22) Filed: Feb. 12, 2001

(30) Foreign Application Priority Data

Feb. 28, 2000 (DE) .......................... 100 09 333

(51) Int. Cl.[7] ............................................. B60R 21/16
(52) U.S. Cl. ................................. 280/728.1; 280/743.1
(58) Field of Search ..................... 280/728.1, 743.1, 280/743.2; 493/405, 450

(56) References Cited

U.S. PATENT DOCUMENTS

| | | | |
|---|---|---|---|
| 5,360,387 A | * | 11/1994 | Baker |
| 5,421,610 A | * | 6/1995 | Kavanaugh et al. |
| 5,690,358 A | * | 11/1997 | Marotzke |
| 5,865,466 A | * | 2/1999 | Yamamoto et al. |
| 6,149,568 A | * | 11/2000 | Ross et al. ................. 493/405 |
| 6,250,675 B1 | * | 6/2001 | Dietsch et al. |
| 6,250,676 B1 | * | 6/2001 | Werstat et al. |
| 6,260,330 B1 | * | 7/2001 | Borowski et al. ........... 493/450 |

FOREIGN PATENT DOCUMENTS

DE     19908610     8/2000

OTHER PUBLICATIONS

"Research Disclosure" No. 39912, pp. 435–436, Jul. 10, 1997, Disclosed Anonymously.*

* cited by examiner

Primary Examiner—Brian L. Johnson
Assistant Examiner—Ruth Ilan
(74) Attorney, Agent, or Firm—Tarolli, Sundheim, Covell, Tummino & Szabo L.L.P.

(57) ABSTRACT

A method for transferring a gas bag for a vehicle occupant restraint system into a mounting provided for the gas bag comprises the following steps: First, the gas bag is folded. Then, the gas bag is heated. Subsequently, the folded gas bag is pressed and simultaneously cooled. Finally, the gas bag is fastened in the mounting.

3 Claims, 1 Drawing Sheet

METHOD FOR THE TRANSFER OF A GAS BAG FOR A VEHICLE OCCUPANT RESTRAINT SYSTEM INTO A MOUNTING PROVIDED FOR THE GAS BAG

The invention relates to a method for the transfer of a gas bag for a vehicle occupant restraint system into a mounting provided for the gas bag.

BACKGROUND OF THE INVENTION

The gas bag of a vehicle occupant restraint system is provided to protect a vehicle occupant from injuries in a vehicle collision, which may occur in the case of an impact of the occupant onto parts of the interior of the vehicle. In its state of rest, the gas bag is folded together in a space-saving manner and is housed in a mounting arranged in the interior of the vehicle.

When the gas bag is a component of a prefabricated module with a housing and with a gas generator accommodated therein, the gas bag is often folded directly into a corresponding mounting of the module housing. The folding of the gas bag must of course be fixed permanently in the housing immediately after the folding process, because it would otherwise open again before the application of the housing covering.

Another method makes provision that the gas bag is firstly folded and the folding is then fixed by the suitable application of a perforated fabric strip or of a plastic band. In this way, the folded gas bag can be stored intermediately as a so-called "prepack", before it is provided as a component for the module installation. A disadvantage here is that the gas bag has to already be completely processed before the folding, i.e. for example already all the seams and tethers have to be arranged on the gas bag, because the gas bag can no longer be unfolded in the meantime. For the same reason, difficulties also exist in the fastening of the gas bag in the module housing, because after a transitory unfolding of the gas bag, which would be advantageous for the installation, the original folding is lost.

SUMMARY OF THE INVENTION

The invention provides a method for the transfer of a gas bag for a vehicle occupant restraint system into a mounting provided for the gas bag, which makes possible a flexible module installation.

According to the invention, the method comprises the following steps: First, the gas bag is folded. Then, the gas bag is heated. Subsequently, the folded gas bag is pressed and simultaneously cooled. Finally, the gas bag is fastened in the mounting. By means of heating the gas bag after folding and subsequent cooling the folded gas bag under pressure, the folding of the gas bag remains for a certain period of time, without a fixing being necessary. The gas bag can therefore be stored intermediately during this time before fastening in the mounting, because the folding is not lost.

For an optimum result, firstly the compatible ranges of the parameters, temperature and pressure for the heating and pressing of the gas bag, respectively, are determined for the specific fabric of the gas bag. The maximum compatible parameters are then used for the method.

It proves to be advantageous to keep the gas bag in the folded state after cooling. Thereby, the folding is maintained longer, so that the gas bag can be stored intermediately over a longer period of time before being installed into the module. For this, the gas bag is preferably packed in a foil. The gas bag can, however, also be placed into a rigid shaped housing or, together with several other gas bags, into a hopper.

The further processing after keeping in the folded state means that the gas bag does not have to be made up in finished form before folding. Various processing steps can also be carried out additionally after folding, so that an extremely flexible processing of the gas bag is made possible.

The further processing of the gas bag is simplified in that it is at least partially unfolded in the meantime. This is possible, because the gas bag can assume its folding again after processing.

Preferably, seams or tethers are arranged on the partially unfolded gas bag. In this way the folding, the sewing or the arranging of tethers can be carried out in any desired sequence, before the gas bag is fastened in the mounting.

Finally, the gas bag can be fastened comfortably in the provided mounting by being at least partially unfolded in turn in the meantime. Thus, for example, screws or rivets for fastening the gas bag can be applied in a simple manner. As the folding can then be produced again, it is possible to finally stow the gas bag without difficulty in the mounting of a module housing.

BRIEF DESCRIPTION OF THE DRAWINGS

Further features and advantages of the invention will be apparent from the following description of a preferred method according to the invention, with reference to the drawing.

FIG. 3 shows a partially unfolded gas bag with tether sewn on;

DETAILED DESCRIPTION OF THE PREFERRED EMBODIMENTS

Figure 1:
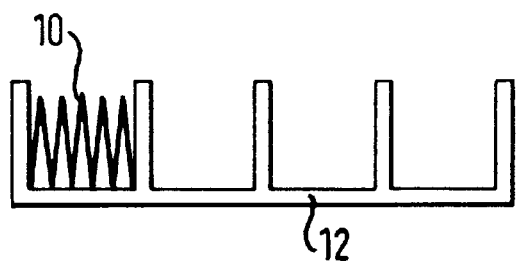
FIG. 1 shows a gas bag placed into a hopper in a schematic sectional view.

A partially sewn-together gas bag 10 is folded to a small volume in a conventional manner. Then the fold packet is heated for example to a temperature between 60 and 120° C. The gas bag 10 is placed into a pressing device and is pressed for example with a pressure between 1 and 2 bar, the pressure onto the fold edges being of crucial importance. These ranges for the method parameters (temperature and pressure) were previously determined for the gas bag fabric which was used. It has been found that the maximum compatible parameters for the specific fabric provide the best result. During the pressing process the gas bag 10 is cooled to room temperature. Then the folding gas bag 10 is packed into a foil and stored intermediately, so that it is kept in the folded state. Alternatively, the gas bag can also be placed into a rigid shaped housing or, as shown in FIG. 1, into a hopper 12. Thus several gas bags 10 can be transported in a space-saving manner to the next processing station or for final installation in the module 14.

Figure 2:
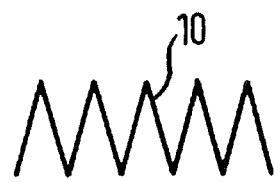
FIG. 2 shows a gas bag after keeping in the folded state.
Figure 3:
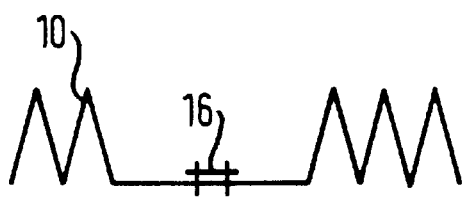

As shown in FIG. 2, the fold packet springs open a little after removal from the foil, but the folding of the gas bag 10 remains for at least one hour. In this time, the further processing of the gas bag 10 takes place, which includes the arrangement of further seams and tethers 16. For this, the gas bag 10 is unfolded manually at the corresponding sites, so that the seams can be arranged in a comfortable manner. In the same way, the tethers 16 are sewn securely on the gas bag 10. In FIG. 3 the partially unfolded gas bag 10 is illustrated with a sewn-on tether 16. After the further processing has been completed, the folding is produced again manually. The gas bag 10 then assumes the shape shown in FIG. 2 again.

Figure 4:
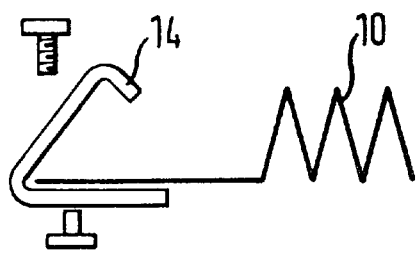
FIG. 4 shows a partially unfolded gas bag with the fastening in a module mounting.
Figure 5:
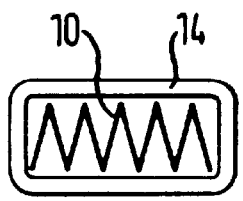
FIG. 5 shows a gas bag stowed in a module.

Lastly the gas bag 10 is fastened in the mounting, provided for this, of a module 14 with a gas generator (not shown). The region of the gas bag 10 which is to be fastened is in turn unfolded manually for this and is fixed with screws or rivets, as shown in FIG. 4. Finally, the folding is produced manually again and the folded gas bag 10 is stowed in the mounting. After the closing of the mounting, the installation is completed (FIG. 5) and the module 14 can be installed at the provided site in the interior of the vehicle.

What is claimed is:

1. A method for transferring a gas bag for a vehicle occupant restraint system into a mounting provided for said gas bag comprising the following steps:

folding of said gas bag;

heating of said folded gas bag;

pressing and simultaneously cooling of said folded gas bag;

fastening of said gas bag in said mounting;

said gas bag being kept in a folded state after cooling; and an additional processing step after being kept in said folded state and before being fastened in said mounting;

said additional processing step consisting of partially unfolding said gas bag.

2. A method for transferring a gas bag for a vehicle occupant restraint system into a mounting provided for said gas bag comprising the following steps:

folding of said gas bag;

heating of said folded gas bag;

pressing and simultaneously cooling of said folded gas bag; and fastening of said gas bag in said mounting;

said gas bag being heated to a temperature between 60° C. and 120° C.

3. A method for transferring a gas bag for a vehicle occupant restraint system into a mounting provided for said gas bag comprising the following steps:

folding of said gas bag;

heating of said folded gas bag;

pressing and simultaneously cooling of said folded gas bag; and fastening of said gas bag in said mounting;

said gas bag being pressed with a pressure between 1 and 2 bar.

* * * * *